US012441312B2

(12) United States Patent
Van Koutrik et al.

(10) Patent No.: US 12,441,312 B2
(45) Date of Patent: Oct. 14, 2025

(54) REAL-TIME, ENERGY-EFFICIENT COMPUTATIONS OF OPTIMAL ROAD VEHICLE VELOCITY PROFILES

(71) Applicant: EMBOTECH AG, Zürich (CH)

(72) Inventors: Sven Van Koutrik, Zürich (CH); Joachim Ferreau, Maur (CH); Stefano Longo, Zürich (CH); Alexander Domahidi, Zürich (CH)

(73) Assignee: EMBOTECH AG, Zürich (CH)

( * ) Notice: Subject to any disclaimer, the term of this patent is extended or adjusted under 35 U.S.C. 154(b) by 147 days.

(21) Appl. No.: 18/033,218

(22) PCT Filed: Oct. 22, 2020

(86) PCT No.: PCT/EP2020/079814
§ 371 (c)(1),
(2) Date: Apr. 21, 2023

(87) PCT Pub. No.: WO2022/083873
PCT Pub. Date: Apr. 28, 2022

(65) Prior Publication Data
US 2023/0391328 A1    Dec. 7, 2023

(51) Int. Cl.
*B60W 30/14* (2006.01)
*B60W 40/105* (2012.01)
*B60W 50/00* (2006.01)

(52) U.S. Cl.
CPC ........ *B60W 30/143* (2013.01); *B60W 40/105* (2013.01); *B60W 50/0097* (2013.01);
(Continued)

(58) Field of Classification Search
CPC ............. B60W 30/143; B60W 40/105; B60W 50/0097; B60W 2050/0031; B60W 2520/10; B60W 2720/103
See application file for complete search history.

(56) References Cited

U.S. PATENT DOCUMENTS 11,814,073 B2 * 11/2023 Jiang ................. B60W 60/0017
2011/0112710 A1    5/2011 Meyer-Ebeling et al.
(Continued)

FOREIGN PATENT DOCUMENTS

CN    105857312 A    8/2016
CN    107117170 A    9/2017
(Continued)

OTHER PUBLICATIONS

"International Search Report and Written Opinion, PCT Application No. PCT/EP2020/079814", mailed May 27, 2021, 14 pages.
(Continued)

*Primary Examiner* — Mohamad O El Sayah
(74) *Attorney, Agent, or Firm* — Mannava & Kang, P.C.

(57) ABSTRACT

The invention is notably directed to a computer-implemented method for controlling a speed of a vehicle given energy-related quantities that pertain to moving the vehicle. Each of said energy-related quantities is being referred to as an energy expense in the following. The method involves two key operations (a full-horizon optimization and multiple, nested short-horizon optimizations), which are performed based on route parameters of a route segment and real-time signals capturing current states of the vehicle. First, a target function of a profile of an energy expense is optimized (S12) for a route segment, to determine a reference profile $X^*_{ref}$ of this energy expense. The optimization is constrained with respect to objectives in respect of a total travel time and/or a total travel energy expense for the vehicle to travel said route segment. A profile of parameter values is obtained (S14-S28) according to a by-product of the optimization. Next, short-horizon speed profiles $V_{ref}$ of the vehicle are repeatedly determined (S32) to plan speeds $V_{ref}$ of the vehicle along local sections of the route segment. Such predictions are achieved by minimizing, for each of the (Continued)

local sections, a cost function as parameterized by one of the parameter values. The cost function captures a cost of deviating from an output of the optimized target function due to such speed profiles; said output and said one of the parameter values pertain, each, to said each of the local sections. Finally, control signals are obtained based on the planned speeds $V_{ref}$. Such control signals can be used for controlling (S40) a speed of the vehicle along each of said local sections of the route segment. The invention is further directed to related systems, vehicles, and computer program products.

18 Claims, 6 Drawing Sheets

(52) U.S. Cl.
CPC . *B60W 2050/0031* (2013.01); *B60W 2520/10* (2013.01); *B60W 2720/103* (2013.01)

(56) References Cited

U.S. PATENT DOCUMENTS

| | | | |
|---|---|---|---|
| 2013/0231841 A1 | 9/2013 | Rothschild | |
| 2014/0032062 A1 | 1/2014 | Baer et al. | |
| 2014/0277835 A1 | 9/2014 | Filev et al. | |
| 2015/0120107 A1 | 4/2015 | Yu et al. | |
| 2015/0276417 A1* | 10/2015 | Yoshizumi | B60W 10/06 701/408 |
| 2017/0036543 A1* | 2/2017 | Tschanz | B60W 50/0097 |
| 2018/0050701 A1 | 2/2018 | Grinenval et al. | |
| 2018/0058868 A1 | 3/2018 | Kang et al. | |
| 2018/0082495 A1 | 3/2018 | Koebler et al. | |
| 2019/0375394 A1* | 12/2019 | Maleki | B60W 20/11 |
| 2019/0378041 A1* | 12/2019 | Dhansri | B60W 30/14 |
| 2021/0061278 A1* | 3/2021 | Zhao | G01C 21/3492 |
| 2022/0017103 A1* | 1/2022 | Koehler | G05B 13/047 |
| 2022/0410889 A1* | 12/2022 | Busse | B60W 40/105 |
| 2023/0049927 A1* | 2/2023 | Engel | B60W 60/005 |

FOREIGN PATENT DOCUMENTS

| | | |
|---|---|---|
| CN | 108583576 A | 9/2018 |
| EP | 2620927 A1 | 7/2013 |
| GB | 2558866 A | 7/2018 |
| JP | 2016000563 A | 1/2016 |
| TW | 201819222 A | 6/2018 |
| WO | 2010081836 A1 | 7/2010 |
| WO | 2010144031 A1 | 12/2010 |
| WO | 2019241307 A2 | 12/2019 |

OTHER PUBLICATIONS

Alessandro Serpi et al., "A Multi-Stage Energy Management System for Multi-Source Hybrid Electric Vehicles", IECON 2019, 45th Annual Conference of the IEEE Industrial Electronics Society, IEEE, vol. 1, Oct. 14, 2019, pp. 5901-5908.

Amir Masoud Bozorgi et al., "A Time and Energy Efficient Routing Algorithm for Electric Vehicles Based on Historical Driving Data", IEEE Transactions on Intelligent Vehicles, IEEE, col. 2, No. 4, Dec. 1, 2017, pp. 308-320.

Bernard Mettler et al., "Receding Horizon Trajectory Planning with an Environment-Based Cost-to-go Function", Proceedings of the 44th IEEE Conference on Decision and Control, and the European Control Conference 2005, Seville, Spain, Dec. 12-15, 2005, pp. 4071-4076.

Johannes Buerger et al., "Nonlinear MPC for supervisory control of hybrid electric vehicles", Jun. 2016 European Control Conference (ECC), 6 pages.

Mohammad Reza Amini et al., "Two-Layer Model Predictive Battery Thermal and Energy Management Optimization for Connected and Automated Electric Vehicles", 57th IEEE Conference on Decision and Control (CDC), Dec. 17-19, 2018, 6 pages.

Sebastian Peitz et al., "A Multiobjective MPC Approach for Autonomously Driven Electric Vehicles", Jul. 2017, 6 pages.

T. Constantijn J. Romijn et al., "A Distributed Optimization Approach for Complete Vehicle Energy Management", IEEE Transactions on Control Systems Technology, vol. 27, No. 3, May 2019, pp. 964-980.

* cited by examiner

REAL-TIME, ENERGY-EFFICIENT COMPUTATIONS OF OPTIMAL ROAD VEHICLE VELOCITY PROFILES

CLAIM FOR PRIORITY

The present application is a national stage filing under 35 U.S.C 371 of PCT application number PCT/EP2020/079814, having an international filing date of Oct. 22, 2020, the disclosure of which is hereby incorporated by reference in its entirety.

BACKGROUND

The invention relates in general to the field of computer-implemented methods for optimally controlling vehicle speeds, as well as related computer program products, computerized systems, and vehicles containing such systems. In particular, it is directed to methods relying on a two-level optimization schemes, wherein a coarse optimization is performed for a whole route segment, while local optimizations are repeatedly performed for local sections of the route segments.

Incorporating information obtained from an entire route optimization in a local (i.e., low-level) optimization scheme (with short prediction horizon) is a challenging problem. Solutions have been proposed, wherein the high-level solution dictates the terminal energy and/or velocity constraints for the low-level solution. Such solutions, however, can lead to strong variations in the local solutions. In other approaches, the local solver relies on a multi-objective scheme, the parameters of which are determined by heuristics, leading to sub-optimal solutions.

For instance, the paper "Multiobjective MPC Approach for Autonomously Driven Electric Vehicles", by Sebastian Peitz et al. (IFAC-PapersOnLine, Volume 50, Issue 1, 2017, Pages 8674-8679), discloses an algorithm for model predictive control (MPC) of non-linear systems with respect to multiple, conflicting objectives. The algorithm involves multiobjective control, an explicit model predictive control, and motion planning with motion primitives. In order to realise real-time applicability, the computation is split into an online and an offline phase. Also, the algorithm proposed relies on heuristics to determine parameters used in the multi-objective problem.

The paper "Nonlinear MPC for supervisory control of hybrid electric vehicles", by Johannes Buerger and Mark Cannon (In European Control Conference, pages 135-140, 2016), proposes a hierarchical MPC strategy for energy management in plugin hybrid electric vehicles. An inner feedback loop addresses the problem of optimally tracking a given reference trajectory for the battery state of charge over a short future horizon using knowledge of the predicted driving cycle. An outer feedback loop generates the state of charge reference trajectory by solving approximately the optimal control problem for the entire driving cycle. The outer loop imposes a terminal constraint on energy to the inner loop.

The paper "Two-Layer Model Predictive Battery Thermal and Energy Management Optimization for Connected and Automated Electric Vehicles" by Mohammad Reza Amini et al. (2018 IEEE Conference on Decision and Control (CDC), Miami Beach, FL, 2018, pp. 6976-6981) proposes a two-layer MPC strategy for battery thermal and energy management of electric vehicle. In the first layer, the long-term traffic flow information and an approximate model reflective of the relatively slow battery temperature dynamics are leveraged to minimize energy consumption required for battery cooling while maintaining the battery temperature within the desired operating range. In the second layer, the scheduled battery thermal and state of charge trajectories planned to achieve long-term battery energy optimal thermal behaviour are used as the reference over a short horizon to regulate the battery temperature.

Beyond academic papers, a number of patent documents form part of the background art. Such documents notably include: US2014277835 A1, WO2010081836 A1, US2013231841 A1, US2018082495 A1, EP2620927 A1, US2018058868 A1, US2014032062 A1, WO2010144031 A1, GB2558866 A, WO2019241307 A2, US2015120107 A1, CN105857312 A, CN107117170 A, CN108583576 A, JP2016000563 A, TW201819222 A, US2019375394 A1, US2019378041 A1, US2011112710 A1, and US2018050701 A1.

SUMMARY

According to a first aspect, the present invention is embodied as a computer-implemented method for controlling a speed of a vehicle given energy-related quantities that pertain to moving the vehicle. Each of said energy-related quantities is being referred to as an energy expense in the following. The method involves two key operations, namely a full-horizon optimization, in which multiple, short-horizon optimizations are nested. Such operations are performed based on route parameters of a route segment and real-time signals capturing current states of the vehicle.

First, a full-horizon optimization is performed based on route parameters of the route segment, whereby a target function of a profile of an energy expense is optimized for the route segment. This optimization is performed to determine a reference profile $X^*_{ref}$ of this energy expense for the entire route segment. The optimization is constrained with respect to objectives in respect of a total travel time and/or a total travel energy expense for the vehicle to travel said route segment.

Remarkably, a profile of parameter values is obtained according to a by-product of the optimization.

Next, short-horizon speed profiles $V_{ref}$ of the vehicle are repeatedly determined, based on real-time signals capturing current states of the vehicle, in order to plan speeds $V_{ref}$ of the vehicle along local sections of the route segment. The short-horizon speed profiles are determined by minimizing, for each of the local sections, a cost function as parameterized by one of the parameter values. The cost function captures a cost of deviating from an output of the optimized target function due to such speed profiles; said output and said one of the parameter values pertain, each, to said each of the local sections (i.e., the current local section). Note, both the full-horizon optimization and the short-horizon minimizations are optimization operations. Notwithstanding, the inner operations are here mostly referred to as "minimizations", for the sake of distinguishing them from the full-horizon optimizations.

Finally, control signals are obtained based on the planned speeds $V_{ref}$. Such control signals can accordingly be used for controlling a speed of the vehicle along each of the local sections of the route segment.

The above method allows information obtained from the optimization performed for the route segment to be judiciously integrated in the local predictions, yet without constraining the latter by way of inequalities. But since the minimized cost function used for the short-horizon operations is constrained by the parameter values derived from the by-product of the full-horizon optimization, smooth speed profiles are determined, which nicely follow the reference solution obtained from the full-horizon optimization. I.e., not only smoothly varying speed profiles are obtained but, in addition, the planned speeds $V_{ref}$ remain coherent with the reference solution at each prediction cycle (for each local section), yet without imposing inequality-based constraints to the short-horizon prediction solver. As a result, the proposed scheme remains computationally tractable for embedded systems, all the more so as the two-level approach used allows a simple cost function to be used for the short-horizon operations.

In embodiments, the target function represents a travel time $t(X_{ref})$ for the vehicle to travel said route segment. The target function is optimized so as to identify said reference profile $X^*_{ref}$ as an argument of the minimum of the target function.

Preferably, the cost function is a mere linear combination of two dependent variables, which is easily minimized, computationally speaking. The cost function includes a first variable t related to a travel time and a second variable E related to a travel energy expense, wherein the second variable is weighted by said one of the parameter values. The profile of parameter values is devised so as to reflect a rate of change of the travel time with respect to the travel energy expense. As a result, the cost function represents an effective temporal cost of locally deviating from said output of the optimized target function.

In preferred embodiments, the method further comprises storing a profile $L_{FF}$ of time-to-energy derivative values, as obtained as said by-product of the constrained optimization, in view of obtaining said profile of parameter values. The profile of parameter values is then obtained based on the profile $L_{FF}$ of time-to-energy derivative values.

Predictions performed at the local level can advantageously be tuned so as to take into account deviations actually observed with respect to the reference profile $X^*_{ref}$. That is, in preferred embodiments, the method further comprises monitoring the actual profile $X_{act}$ of the energy expense of the vehicle as it travels along the route segment. The actual profile $X_{act}$ is compared with the reference profile $X^*_{ref}$ obtained from the constrained optimization, to obtain a comparison outcome. Eventually, the profile of parameter values is obtained according to both the profile $L_{FF}$ of time-to-energy derivative values and said comparison outcome.

In particular, the method may further comprise estimating a profile $L_{dev}$ of derivatives of the time-to-energy derivative values with respect to a temporal energy consumption C of the vehicle. In that case, the parameter values may be obtained according to both the comparison outcome and the estimated profile $L_{dev}$ of derivatives of the time-to-energy derivative values. Preferably, estimating the derivatives of the time-to-energy derivative values comprises numerically computing such derivatives, based on at least two profiles of time-to-energy derivative values.

For example, the parameter values may be tuned thanks to a correction value $L_{cor}$, where the latter is obtained by first feeding the comparison outcome to a tracking controller to obtain a tracking controller output, and then multiplying the tracking controller output obtained by an estimated one of the derivatives of the time-to-energy derivative values corresponding to said each of the local sections, which results in said correction value. Finally, the correction value is summed with one of the time-to-energy derivative values that corresponds to said each of the local sections to obtain said one of the parameter values.

Preferably, the constrained optimization is performed subject to: (i) a model of the vehicle taking said route parameters as inputs (and, optionally, other parameters); and (ii) one of the total travel time and the total travel energy expense being less than or equal to a given value at the end of a journey corresponding to said route segment.

In embodiments, performing said constrained optimization further comprises feeding the model of the vehicle with one or each of permanent parameters of the vehicle and an initial state of the vehicle.

Preferably, the method is performed for controlling the speed of the vehicle along multiple route segments. Yet, the same basic scheme is implemented for each route segment. That is, the method comprises performing multiple full-horizon optimizations, each similar to said full-horizon optimization, for respective ones of the multiple route segments. Then, for each of the multiple full-horizon optimizations performed, short-horizon speed profiles $V_{ref}$ of the vehicle are repeatedly determined (as described above), in order to plan speeds $V_{ref}$ of the vehicle along local sections of a respective one of said route segments.

In preferred embodiments, the speeds $V_{ref}$ are planned using a model predictive control algorithm, or MPC algorithm, where the latter is preferably run using a nonlinear programming solver.

In embodiments, the cost function is minimized subject to a dynamical model of the vehicle, the dynamical model taking said real-time signals as input (and, optionally, other parameters), wherein the real-time signals represent one or more of a speed, an acceleration, an available energy, a thermal state, a powertrain, and a braking efficiency of the vehicle.

In typical embodiments, the method further comprises actuating the vehicle in the physical world, according to the control signals obtained.

In preferred embodiments, the method further comprises planning motion of the vehicle based on the control signals obtained, wherein the motion planned is tentatively constrained according to the planned speeds $V_{ref}$.

In embodiments, the minimization algorithm is devised in such a manner that an average duration of minimizing the cost function is, for each of the local sections, between 10 ms and 1 s.

According to another aspect, the invention is embodied as a computerized system for controlling a speed of a vehicle along a route segment. The system comprises: processing means; a memory; and storage means storing computerized methods. The system is configured to load the computerized methods in the memory and run the loaded computerized methods, so as to cause the processing means to optimize a target function, obtain a profile of parameter values according to a by-product of the optimization, plan speeds $V_{ref}$ of the vehicle along local sections of said route segment, and accordingly obtain control signals for controlling a speed of the vehicle along each of said local sections, consistently with the present methods.

According to a further aspect, the invention is embodied as a vehicle. The vehicle comprises: one or more sensors, each configured to detect a quantity impacting a dynamical state of the vehicle and accordingly produce sensor signals; a receiving unit connected to the one or more sensors and configured to receive said sensor signals from the sensors to produce said real-time signals, in operation; and a computerized system such as described above. The system is connected to the receiving unit, so as to receive said real-time signals and the computerized system is further configured in the vehicle so as to instruct to actuate the latter according to the control signals obtained, in operation.

According to a final aspect, the invention is embodied as a computer program product for controlling a speed of a vehicle. The computer program product comprises a computer readable storage medium having program instructions embodied therewith, wherein the program instructions are executable by processing means to cause the latter to take steps according to the present methods.

Computerized methods, systems, vehicles, and computer program products embodying the present invention will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

The accompanying drawings show simplified representations of computerized systems and vehicles as involved in embodiments. Similar or functionally similar elements in the figures have been allocated the same numeral references, unless otherwise indicated.

DETAILED DESCRIPTION OF EMBODIMENTS OF THE INVENTION

Figure 1:
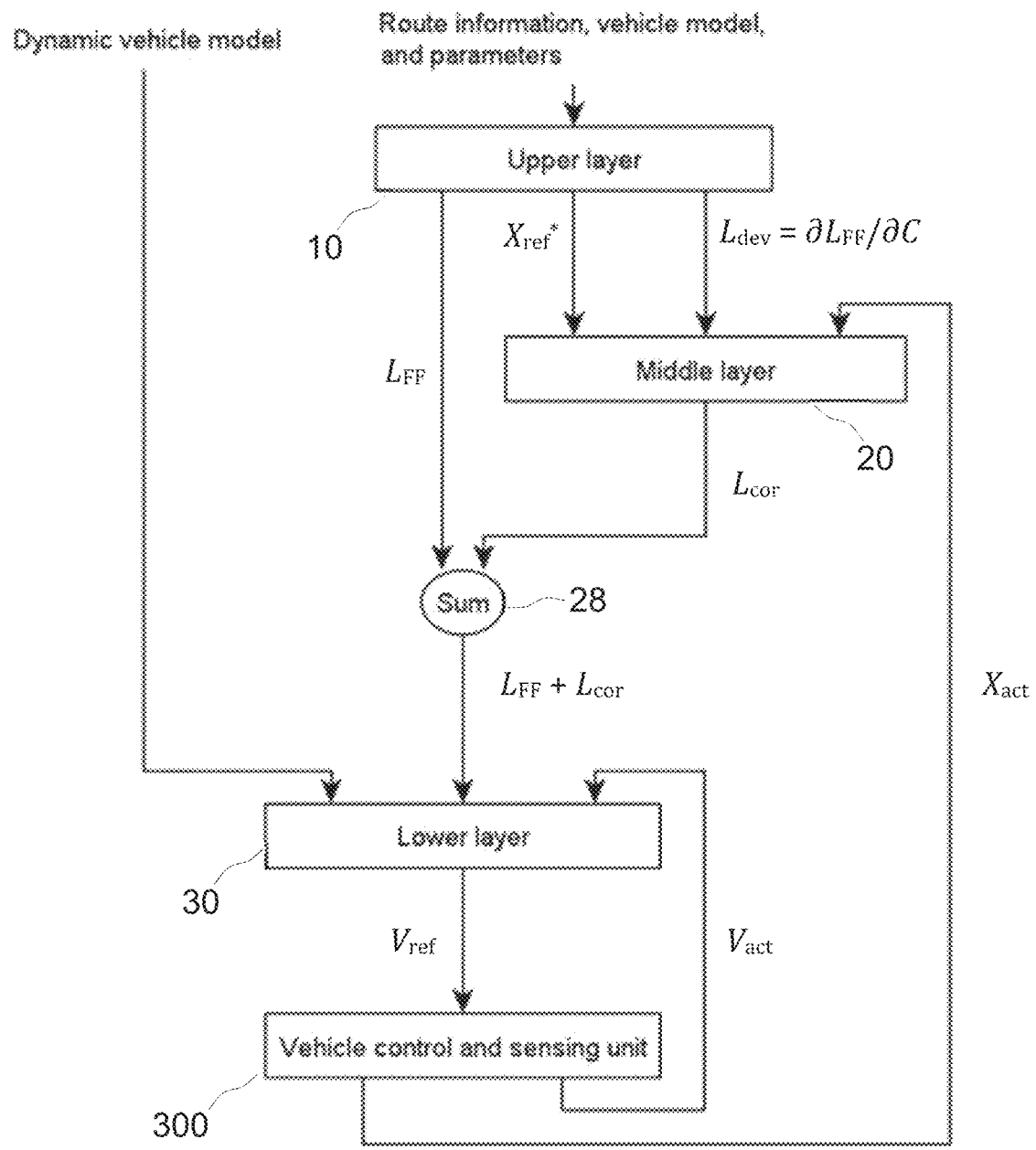
FIG. 1 is a diagram schematically illustrating how high-level computerized modules (i.e., an upper layer, a middle layer, and a lower layer, interacting with a vehicle control unit) communicate, as in embodiments.

The following description is structured as follows. First, general embodiments and high-level variants are described (section 1). The next section addresses particularly preferred embodiments and technical implementation details (sections 2 and 3, respectively). Note, the present method and its variants are collectively referred to as the "present methods". All references Sij refer to methods steps of the flowchart of FIG. 5, while numeral references pertain to parts or components of the present systems.

1. General Embodiments and High-Level Variants

In reference to FIGS. 1, 2, 5, and 6, an aspect of the invention is first described, which concerns a computer-implemented method for controlling a speed of a vehicle 1 along one or more route segments.

The method involves energy-related quantities, wherein each of said quantities is referred to as an "energy expense" in the following. An energy expense refers to a quantity that pertains to moving the vehicle, e.g., an energy required for the vehicle to travel a certain distance. The energy expense may notably relate to a depletion of energy, an energy budget, an energy consumption (an amount of energy per fixed distance), or a temporal energy consumption (an amount of energy per fixed time duration).

The method involves: (i) a full-horizon optimization step S10 for a given route segment; and (ii) several, short-horizon optimization steps S30, which judiciously make use of parameter values as obtained from the full-route segment optimization S10. Such operations can be performed online (i.e., in real time, on-the-fly, in the embedded computerized system), thanks to the efficient interaction scheme between the full-route segment and short-horizon optimization steps. These operations are performed based on route parameters of a route segment and real-time signals capturing current states of the vehicle 1.

In detail, a target function is first optimized S12 according to a full-horizon optimization, based on such route parameters, as well as other parameters, if necessary. The target function is a function of a profile of an energy expense (i.e., an energy-related quantity) for the route segment. This optimization step S12 aims at determining a reference profile $X^*_{ref}$ of this energy expense for the entire route segment. The optimization S12 is constrained with respect to objectives in respect of a total travel time and/or a total travel energy expense for the vehicle to travel said route segment.

Importantly, a profile of parameter values is obtained S14-S28 according to a by-product of this optimization S10. Note, the by-product stems from the fact that solving the optimization S10 involves calculating a corresponding cost function gradient (or a similar function); the parameter values obtained can thus be related to Lagrange multiplier values. As it may be realized, such parameter values can then be judiciously utilized in local optimizations made at step S30.

Namely, short-horizon speed profiles $V_{ref}$ of the vehicle are repeatedly determined S32, based on real-time signals S70 that capture current states of the vehicle, as well as other parameters, if necessary. Step S32 is performed so as to plan speeds $V_{ref}$ of the vehicle along local sections of said route segment. That is, one or more speed values are planned, which pertain to respective ones of the local sections of the route segment. Thus, step S32 is repeatedly performed, for each local route section.

The speed planning is achieved by minimizing S32 a cost function for each of the local sections. This cost function is, each time, parameterized by the parameter value that pertains to a current local section. This cost function captures a cost of deviating from an output of the optimized target function (i.e., the output pertaining to the same current local section), due to such speed profiles. In other words, the speed profiles are optimized through repeated minimizations of the cost function and, at each minimization step, the minimized cost is the cost as caused by a speed profile as currently determined for the short-horizon.

Finally, control signals are obtained S40 based on the planned speeds $V_{ref}$. The control signals are signals adapted for controlling the speed of the vehicle along each of the local sections of the route segment, as per the latest speeds as planned at step S32.

Comments are in order. To start with, a "profile" denotes a spatial or temporal evolution of a quantity, i.e., how this quantity changes over space or time. The present profiles may thus refer to spatial or temporal profiles. In preferred implementations, they correspond to spatial profiles because the target quantities are preferably discretized in space. However, the problem can also be posed in temporal terms only, in which case the profiles obtained are temporal profiles. Even, more sophisticated approaches may possibly pose the problem as a spatiotemporal problem.

Thus, the reference profile $X^*_{ref}$ as obtained in output of step S12 may possibly refer to a spatial and/or a temporal evolution of an energy expense, i.e., an energy-related quantity of the vehicle, such as the energy that is necessary for the vehicle to travel said route segment, subject to given constraints. In variants, the reference profile $X^*_{ref}$ pertains to a spatial or temporal evolution of the energy consumption of the vehicle, as necessary for the vehicle to travel said route segment.

Similarly, the profile of parameter values as obtained at step S28 refers to parameter values that vary along the route segment, consistently with the reference profile $X^*_{ref}$ of the energy-related quantity. There can be a one-to-one mapping between values of the reference profile $X^*_{ref}$ and the parameter values, although this is not strictly required. What matters is that the minimization step S32 calls, each time, a parameter value that is relevant to a current operation S32.

In the present case, the profile of parameter values is obtained as a by-product (or based on such a by-product) of the constrained optimization S10, reflecting gradients computed for this optimizations. Note, a flat parameter value profile may nevertheless possibly be obtained in certain circumstances.

For completeness, each of the determined speed profiles refer to speed values as determined for a current short-horizon, i.e., corresponding to a current local route section (or a portion thereof, and/or an upcoming local route section (or a portion thereof). That is, each speed profile aggregates speed values for the near future, i.e., values that vary along a current and/or upcoming route segment (or a portion thereof).

Each of the local sections of the route segment may be defined spatially and/or temporally. However, in the following, said local sections are assumed to be local, spatial sections of the route segment, for simplicity. Consistently, all the profiles (including the reference profile of the energy expense, the parameter value profile, and the speed profiles) are assumed to be spatial profiles in the following.

Figure 6:
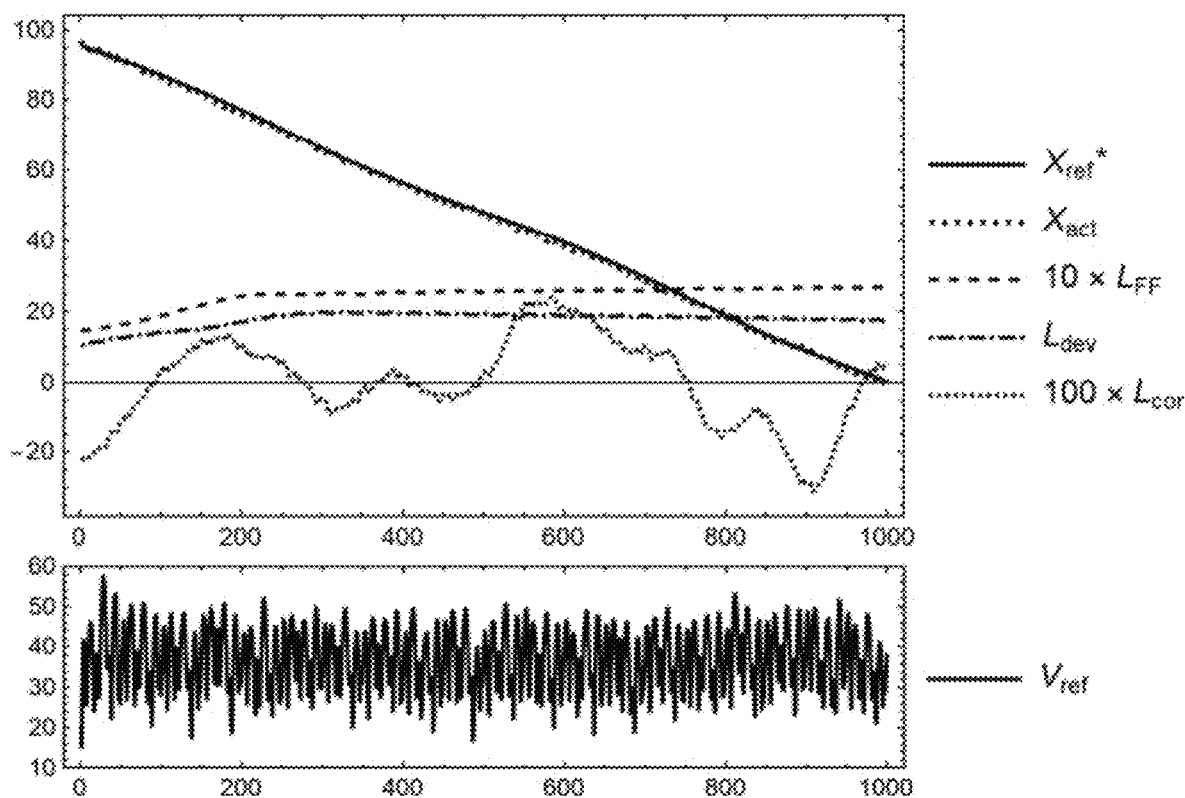
FIG. 6 shows plots of quantities involved in embodiments, wherein the plots show how such quantities typically vary along a given route segment. The upper plot shows all quantities but the planned speeds $V_{ref}$, which are shown in the lower plot, for the sake of depiction.

FIG. 6 depicts profiles of quantities as involved in embodiments of the invention, including the reference profile $X^*_{ref}$ and the planned speeds $V_{ref}$. FIG. 6 shows how such quantities may typically vary, spatially, along a given route segment. Notwithstanding the depictions in FIG. 6, which may suggest that continuously varying quantities are involved, the present profiles are typically piece-wise constant, e.g., having constant values along sections or sub-sections of the route segment. That is, each route segment is broken down into several local sections for the purpose of locally planning speeds $V_{ref}$. Such speeds $V_{ref}$ may, nevertheless, be regarded as continuous functions in the limit of infinitesimal (sub-)sections. In that respect, at least some, if not all, of the required quantities are preferably computed numerically, for computational efficiency reasons.

Note, the speed values as eventually planned correspond to the determined speed profiles $V_{ref}$. One may, however, keep in mind that any speed profile $V_{ref}$ as determined at each step S32, may include several speed values (i.e., a vector of speed valued associated to successive timestamps), such that the repeated minimization steps S32 may give rise to time-overlapping speed values. FIG. 6 depicts speed values as effectively planned for successive local sections of the route segment; it does not depict overlapping profiles of speed values.

The present methods typically aim at actuating S60 the vehicle 1 in the physical world, according to the control signals as eventually obtained S40. As said, all computations incurred can typically be performed online (i.e., locally, in real time, and on-the-fly), by the computerized system 202 of the vehicle 1, without it being needed to connect to another system (e.g., wirelessly to a remote server) for performing such computations, even though some input data may possibly need to be accessed wirelessly from a remote server, to perform such computations. The present methods may for instance be performed locally and independently by a vehicle-embedded system 202, as described later in reference to another aspect of the invention.

In variants, such methods may be performed for computerized simulation purposes, in which case both the real-time and control signals interact through the simulation performed.

Moreover, the speed profile determinations S30 may possibly be interwoven with motion planning predictions S50, using the control signals obtained at step S40 as input. In that case, the motion planning algorithm attempts to satisfy constraints in terms of speeds as planned at step S30, safety permitting. That is, vehicle motion may possibly be planned S50 based on the control signals obtained at step S40. However, the motion planned will only be tentatively constrained according to the planned speeds $V_{ref}$. I.e., the motion planning algorithm S50 may well choose to deviate from a planned speed profile if the road conditions or the environment of the vehicle require it. Speed profiles may nevertheless be later recomputed, during subsequent determination steps S30, to try and match the reference profile $X^*_{ref}$. If necessary, a new optimization S10 may be triggered, should it be impossible to plan speeds $V_{ref}$ that are coherent with the previously determined reference profile. Again, the planning method S50 may aim at actuating a real vehicle or simulating motion of a vehicle.

In the following, the constrained optimization S10 is assumed to be performed by an upper layer 10 while speed planning steps S30 are assumed to be performed by a lower layer 30, as illustrated in FIG. 1. The lower-layer steps S30 are repeatedly performed. That is, at least two cycles (likely many more) of minimization S30 are performed for each local section of the route segments. Yet, several upper-layer steps S10 may possibly be performed (once, or a few times only, for each route segment), as in embodiments described latter. In all cases, one upper-layer optimization step S10 (for one route segment) gives rise to multiple lower-layer steps S30.

The upper and lower layers 10, 30 both aim at computing related quantities, albeit using different approaches. That is, the two layers 10, 30 solve a similar problem, although on different spatial and/or time scales. I.e., the upper layer 10 works on the full horizon, corresponding to a whole route segment, whereas the lower layer 30 works on a local (short) horizon. Therefore, the lower layer 30 can be regarded as repeatedly reoptimizing, locally, speed values $V_{ref}$ that are coherent with the reference energy-related profile $X^*_{ref}$ as initially obtained S10 at the upper layer 10.

Coarse grid calculations performed at the upper layer 10 are based on a first (large) discretization interval size, which may possibly correspond to a full route, whereas the lower-layer calculations S30 are performed using a second discretization interval size, likely much smaller than the first, the purpose of the lower layer 30 being to plan speeds $V_{ref}$ for the very near future only. Typically, the average duration of the minimization performed at step S32 is between 10 ms and 1 s (for each local section).

The parameter values determined from S10 may for instance be determined based on time-to-energy derivative values obtained S10 as by-products of the constrained solution for the full horizon. In simple implementations, the parameter values are solely obtained from the upper layer 10, e.g., they may simply correspond (i.e., be equal) to the time-to-energy derivative values. In more sophisticated implementations, however, the time-to-energy derivative values are locally corrected by tracking the actual energy expense profile of the vehicle, thanks to a middle layer 20 interacting with the upper layer 10 to eventually provide S28 corrected parameter values, see FIG. 1.

The full-horizon optimization S10 and the short-horizon optimizations S30 rely on distinct vehicle models. The vehicle model used in the upper layer 10 primarily relies on macro parameters (i.e., parameters that remain constant over the entire route segment), referred to as "route parameters" above. The latter may notably involve parameters such as the road inclination, traffic states, road curvatures, speed limits, wind speed and direction, etc. Permanent states or performance indicators of the vehicle (e.g., mechanical constraints, energy consumption) may possibly be considered as well, in addition to the route parameters. Moreover, the upper layer model may possibly take into account information extracted from temporary states of the vehicle (e.g., the battery charge and/or fuel level), as initially read before starting the journey.

Thus, the constrained optimization may notably be performed S12 subject to: (i) the upper-layer model of the vehicle (taking the route parameters as inputs); and (ii) a constraint with respect to a total travel quantity (i.e., the travel time or energy expense), where this quantity is constrained to be less than or equal to a given value at the end of a journey corresponding to said route segment. E.g., the total travel time may be constrained to be less than a given time duration or the total energy expense may be constrained to be less than a given energy expense value.

The lower-layer cost function is preferably minimized S32 subject to a dynamical model of the vehicle. Contrary to the upper-layer model, the dynamical model used at step S30 primarily relies on information captured by the real-time signals. That is, the determinations S30 of the speed profiles primarily rely on dynamical states of the vehicle, as obtained from the real-time signals. Such dynamical states may for example include (but are not necessarily limited to) one or more of: the current speed, acceleration, available energy, thermal state, other quantities such as quantities measuring jerk, change of yaw rate, and quantities related to powertrain and/or the braking efficiency of the vehicle. Moreover, the model used in the lower layer 30 may also use local route parameters. The lower-layer model can be more detailed (i.e., more sophisticated) than the upper-layer model, inasmuch as executions at the lower layer 30 are limited to a short horizon.

Note, the terminology "real-time" as used herein refers to requirements in terms of throughputs required for ensuring sufficiently fast predictions in view of, e.g., enabling a safe autonomous, semi-autonomous, automated (or partly automated) motion of the vehicle 1.

In embodiments, the vehicle model used in the upper layer describes the relation between the theoretical velocity (i.e., speed), consumption, and distance dependent road parameters (including road inclination, traffic, curviness, velocity limits, and wind). Its states may notably involve velocity and (battery) energy. Thermal states of the vehicle might be included too.

In embodiments, the lower-layer model includes similar states (velocity, energy level, etc.) as the model used in the upper layer. This model typically relies on current states of the vehicle (as initial conditions) in order to plan future velocity profiles. The parameters of the lower-layer model may possibly include more fine-grained details such as curvature profiles, locations and predictions pertaining to other vehicles, as well as traffic light information. This model may notably describe vehicle longitudinal and battery models. An example is a point-mass model with nonlinear powertrain maps.

The speed values $V_{ref}$ are preferably planned using S30 a model predictive control algorithm, or MPC algorithm, as assumed in the following. In fact, both the upper layer 10 and lower layer 30 may be regarded as forming, together, part of an MPC algorithm, albeit using distinct vehicle models, where such models are typically fed with distinct input data. The MPC algorithm and, more generally, the computational schemes described herein, are preferably executed using non-linear programming instructions.

The signals capturing the states of the vehicle are continuously received S70. Such signals may be digital signals (e.g., received as time series) or analogue signals (e.g., received continuously, possibly uninterruptedly), which are then converted to digital signals. The lower-level steps S30 may be regarded as computational cycles that are repeatedly performed at the lower layer 30 for planning speeds of the vehicle. So, at each time step (or computational cycle) of the minimization algorithm S30, the current or quasi-current state of the vehicle is known and consumed by this algorithm. The time scale at which real-time signals are received S70 must be compatible with the time steps of the prediction algorithm S30. Thus, the frequency at which such signals are accessed or updated S70 is normally larger than or equal to the frequency of the computation cycles performed at the lower layer S30. So, at each cycle S30, new speed values $V_{ref}$ can be planned based on the latest available vehicle state.

There is, to the knowledge of the present Inventors, no known solution to efficiently include information as obtained for the entire route segment in the low-level prediction loop (for short prediction horizons); the existing solutions mostly rely on heuristics. Thus, a first challenge is to arrive at a formulation of the problem that yields exploitable results. To that aim, the present methods first perform a full-horizon optimization for the full route segment, which allow parameter values to be obtained according to a by-product of this optimization. As one may realize, such parameter values can subsequently be pertinently used in the local optimization problem. Thus, instead of performing many inequality-based constrained optimizations at the lower layer 30 (which problem is difficult to formulate), mere minimizations are needed, in which the minimized cost function is nevertheless parameterized so as for the planned speeds $V_{ref}$ to remain, each time, coherent with the reference profile $X^*_{ref}$ predicted by the upper layer 10.

Yet, because the local planning steps S30 rely on parameter values as obtained from the upper-layer optimization S10, the minimization performed S30 can still be regarded as a constrained optimization. I.e., the lower-layer minimization is indirectly impacted by inequality constraints used at the upper layer 10, owing to the parameter values passed to the lower-layer solver. The lower-layer model has to be satisfied, albeit being based on equality constraints. I.e., the lower-layer minimization does not have inequality constraints in respect of its variables, e.g., the total travel time and the total travel energy expense. In other words, the lower-layer model does not involve bounds of time or energy-related quantity.

Not only the proposed approach is computationally tractable (especially for embedded systems), but, in addition, this approach allows smooth paces to be obtained, which nicely follow the reference solution obtained at the upper layer 10.

Existing solutions typically have the high-level solution dictating the terminal energy and/or velocity constraints for the low-level solution, contrary to the approach proposed here. This can lead to strong variations in the local solutions, depending on the resolution of the reference solution. Other works use a multi-objective economic MPC for the local solver, but the weights are determined by heuristics that yield sub-optimal results.

All this is now described in detail, in reference to particular embodiments of the invention. To start with, the target function preferably represents a travel time $t(X_{ref})$ for the vehicle to travel said route segment. That is, $t(X_{ref})$ is a functional of $X^*_{ref}$, which, itself, is a function representing the profile of energy expense. Advantageously, such a target function can be optimized S12 so as to identify the reference profile $X^*_{ref}$ as an argument of the minimum of the target function. In practice, this may for instance amount to compute:

$$(X^*_{ref}, t^*) = \text{argmin } t(X_{ref}),$$

subject to:
  A model of the vehicle; and
  An energy at the end of the journey that is less than or equal to a certain value.

While $X_{ref}$ represents a function, $X^*_{ref}$ is the optimal profile, i.e., one of the arguments of $t(X_{ref})$ at the minimum, which then becomes the reference profile for the lower-layer minimization S30. In addition, $t^*$ is the optimal time to complete the journey, as per the optimization performed.

Figure 5:
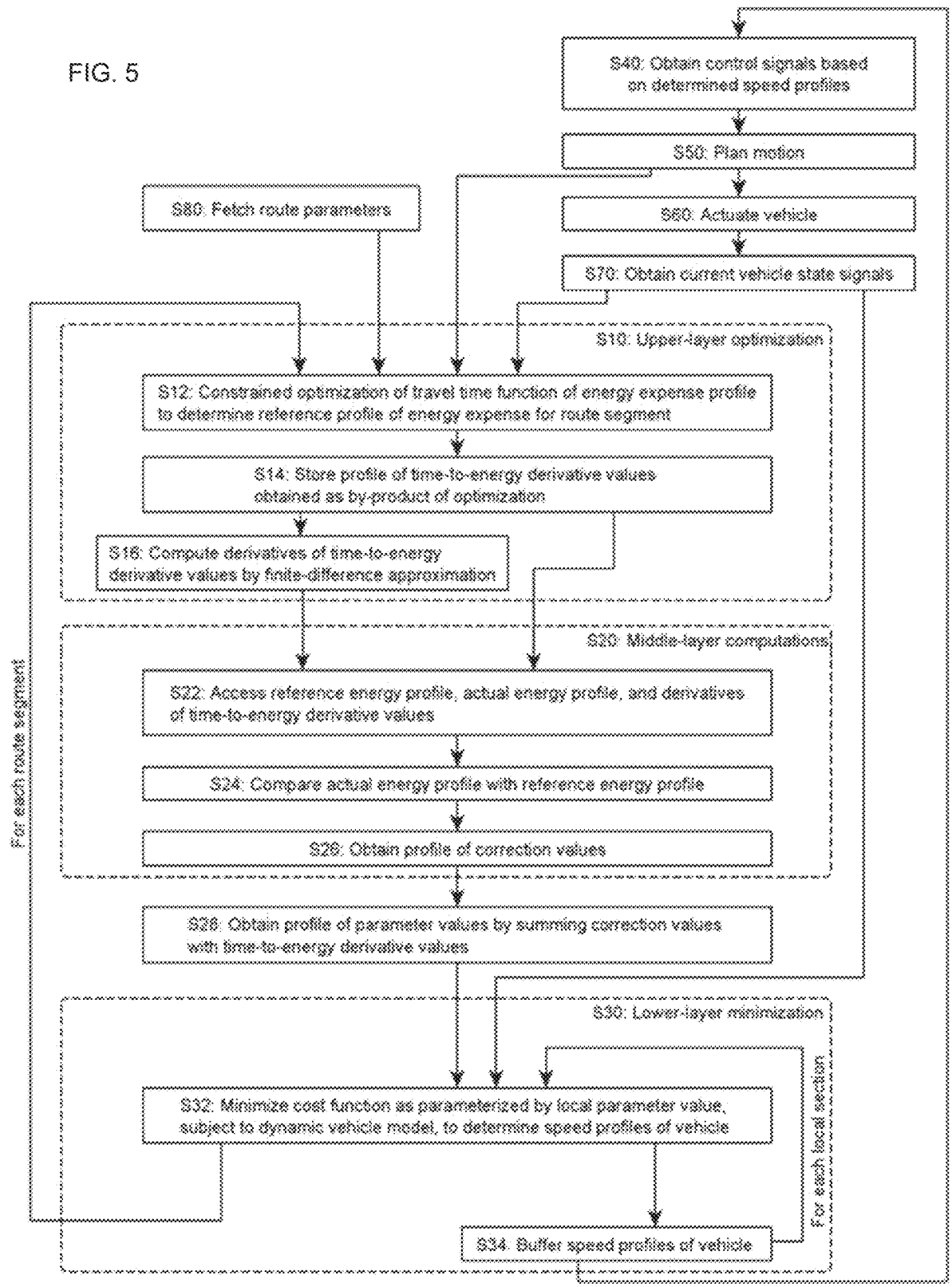
FIG. 5 is a flowchart illustrating high-level steps of a method of controlling a speed of a vehicle, according to preferred embodiments.
Figure 7:
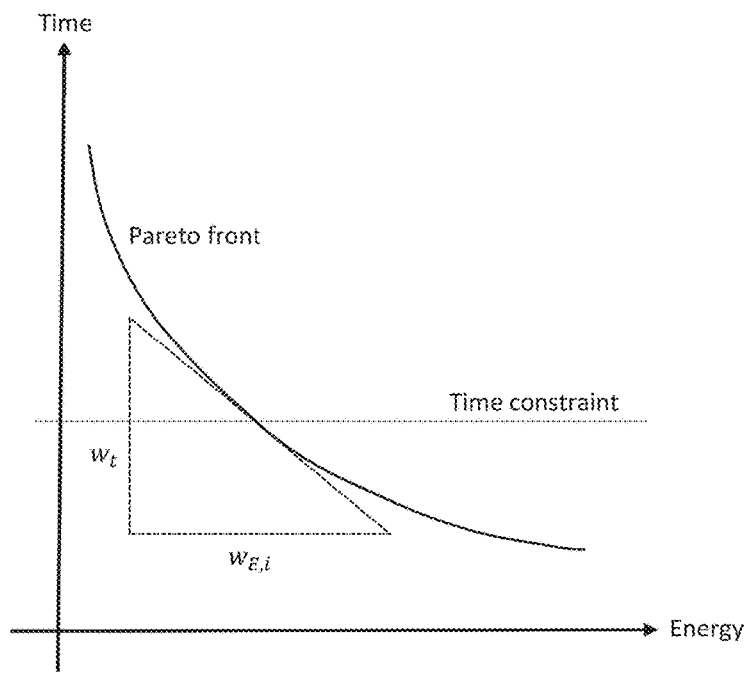
FIG. 7 is another plot illustrating how weights of a cost function used for prediction purposes can be derived from the upper layer solver.

The cost function used at the lower layer 30 may advantageously be devised as a very simple function, so as speed up computation cycles as repeatedly performed S30 by the lower layer 30. Referring more particularly to FIGS. 5-7, this cost function may for instance be a linear combination of only two dependent variables, these including a first variable t, related to a travel time, and a second variable E, related to a travel energy expense, where the variable E is weighted by the parameter values. More precisely, the variable E is weighted by a parameter value pertaining to the current local section, so as for the lower-layer results to remain coherent with the upper-layer solution at each minimization cycle S30, i.e., for each operation as made for each local section of the route segment. The cost function can for instance be written $$\text{Cost}_1(i) = t + w_i \cdot E,$$

where $w_i$ is a parameter value pertaining to the ith local section of the route segment. Note, the notation "Cost$_1$(i)" is a shorthand notation: the actual arguments of the cost function are t, $w_i$, and E. As formulated above, the cost function restricts to a linear combination of two variables, which is easily minimized. The cost function does not have to be constrained with respect to any of the two dependent variables t and E; the only constraint is that the parameter values $w_i$ are imposed, based on outputs of the upper layer 10.

Note, the profile $\{w_i | i \in \mathbb{N}, 1 \leq i \leq \ldots\}$ of parameter values, hereafter noted $\{w_i\}$, is preferably devised so as to reflect a rate of change of the travel time with respect to the travel energy expense. Accordingly, the weighted variable $w_i \cdot E$ represents an effective (energy-related) temporal cost correction, whereas t is a purely temporal cost in the above formulation of the cost function.

In other words, the product of the parameter value $w_i$ and the second variable E can be regarded as a time correction (for the current local section i) that modulates values of the first variable t during the minimization S30. The time correction $w_i \cdot E$ can be understood as a corrective term that comes to correct the cost incurred according to the sole variable t for energy consumption consistently with the reference profile $X^*_{ref}$ obtained, where $X^*_{ref} = \{X^*_{ref,i} | i \in \mathbb{N}, 1 \leq i \leq \ldots\}$. As a result, the above cost function represents, as a whole, an effective temporal cost of locally deviating from an output $X^*_{ref,i}$ of the optimized target function, where this output $X^*_{ref,i}$ pertains to the current local section i.

Note, the cost function may possibly involve more than one parameter. For example, the cost function may involve two parameters, e.g., one parameter weighting each variable. In that case, the cost function can be written $$\text{Cost}_2(i) = w_t \cdot t + w_{E,i} \cdot E.$$

FIG. 7 illustrates, intuitively, how the weights $w_t$ and $w_{E,i}$ of the cost function Cost$_2$ used by the lower layer solver are derived from the upper layer constrained solver. In reality, however, there is no need to explicitly compute the Pareto front function. Instead, parameter values (related to the Lagrange multiplier values resulting from the upper-layer optimization S10) are obtained as a by-product of the solution of the upper layer optimization problem. And such parameter values can be regarded as corresponding to the derivative of the Pareto front function at a point of interest, i.e., the point of intersection with the chosen time constraint in the example of FIG. 7.

However, the two parameters intervening in the function Cost$_2$ can normally be reduced to a single parameter by dividing the cost function Cost$_2$ by $w_t$. So, what matters in that case is the ratio $w_{E,i}/w_t$, which corresponds to $w_i$ in the function Cost$_1$. Thus, the parameter values determined at step S28 may, in embodiments, correspond to ratios $w_{E,i}/w_t$ as involved in the lower-layer cost function Cost$_2$.

For completeness, the cost function need not necessarily be formulated as a linear function, though it preferably is, to speed up computations S30. E.g., the cost function may, in variants, be formulated a product of the two variables, e.g., $$\text{Cost}_3(i) = t^{\alpha_t} \cdot E^{\alpha_{E,i}},$$

where the exponents $\alpha_t$ and $\alpha_{E,i}$ are dimensionless parameters in that case, which may possibly be reduced to a single exponent $\alpha'_{E,i}$ i.e., $$\text{Cost}_4(i) = t \cdot E^{\alpha'_{E,i}}.$$

The exponent values $\alpha_{E,i}$ and $\alpha'_{E,i}$ can be derived from the upper-layer solution S10.

In all cases, the cost function used by the lower layer 30 does not need to be constrained with respect to any of its dependent variables. Preferred embodiments rely on a cost function formulated as a linear combination, rather than a product, as this makes computations S30 easier, especially for embedded systems. In the following, the cost function is assumed to be a linear combination, for simplicity.

The following describes how the parameter values can be computed in practice. In simple implementations, the parameter values are obtained based on the sole upper-layer optimization S10. In more sophisticated approaches, the outcome from the upper-layer optimization is corrected online (i.e., in real time), e.g., thanks to a middle layer 20 (see FIGS. 1 and 2), to account for possible deviations between the actual profile and the reference profile of energy expense.

In both approaches, however, the parameter values are preferably obtained thanks to a profile $L_{FF}$ of time-to-energy derivative values. Such quantities may have the same dimensions as the final parameter values. The profile $L_{FF}$ is obtained as a by-product of the constrained optimization S12. As such, the time-to-energy derivatives can be related to Lagrange multiplier values pertaining to the optimization S10.

In practice, the time-to-energy derivative values may for instance be obtained as $L_{FF} = \partial(1/v)/\partial C = \partial t_s/\partial E_s$, that is, as a profile of derivatives of time to energy along the route segment. Again, at least one derivative value will be made available for each local section of the route segment. In the previous equation, C refers to a distance-based energy consumption, e.g., in J/m. Essentially, $L_{FF}$ can be regarded as a profile of time-to-energy derivative values, including one value for each individual route section. In variants, the time-to-energy derivative may be computed based on the travel time function $t(X_{ref})$, for example.

In embodiments, the profile of parameter values is simply set equal to the profile $L_{FF}$ of time-to-energy derivative values. I.e., each parameter value is taken as a respective one of the time-to-energy derivative values; no middle layer 20 is needed in that case as no tracking is needed. Such a simple solution already makes it possible for the local computations S30 to track the reference solution $X^*_{ref}$. I.e., the lower-layer solution can be constrained, via the parameter values, so as for the planned speed values $V_{ref}$ to be coherent with the reference energy profile.

In preferred embodiments, however, the time-to-energy derivative values $L_{FF}$ are further tuned, thanks to corrective terms, so as to obtain S28 the final parameter values, as assumed in the following. In that case, the profile $L_{FF}$ as obtained upon completing the optimization S12 is stored at step S14, in view of obtaining S16-S28 the final parameter values. E.g., the time-to-energy derivative values are buffered S14, in view of computing further values that will be passed to the middle layer 20, to correct the initial parameter values.

Figure 2:
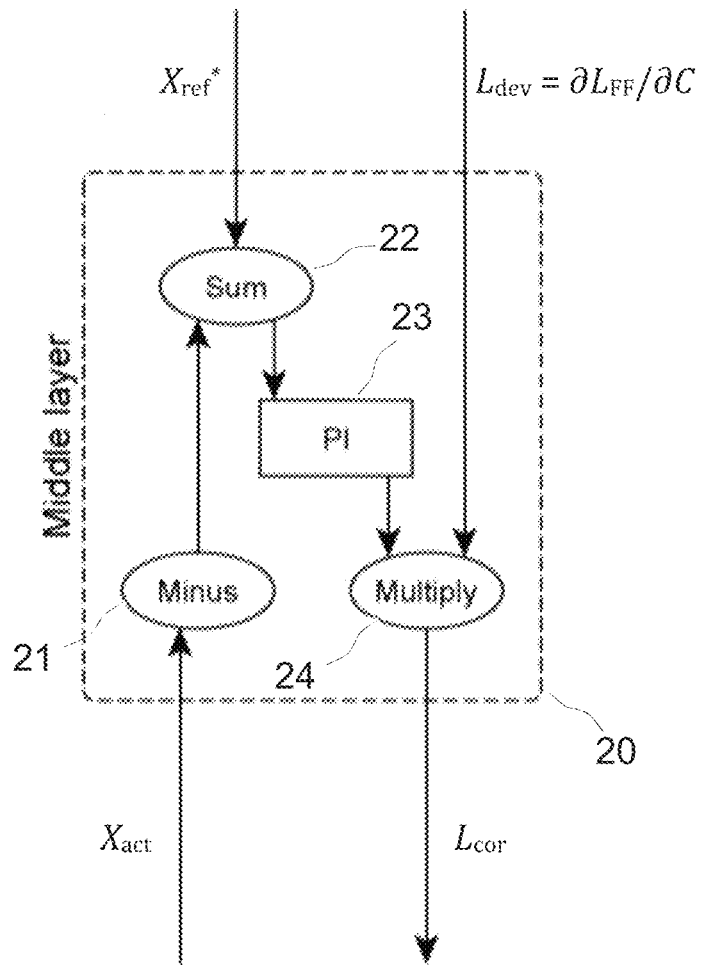
FIG. 2 is another diagram illustrating operations performed by the middle layer of FIG. 1, as in embodiments.

In that respect, the present methods preferably monitor S22 the actual profile $X_{act}$ of the energy expense of the vehicle as it travels along the route segment, see FIGS. 2 and 5. Comparing S24 the actual profile $X_{act}$ (as monitored) with the reference profile $X^*_{ref}$ obtained from the constrained optimization S10 allows a comparison outcome to be obtained, based on which the profile of parameter values can eventually be computed S26-S28. I.e., such parameter values can be computed according to both the profile $L_{FF}$ of time-to-energy derivative values and the comparison outcome.

Steps S22-S26 (S20) are performed by the middle layer 20, which can also be regarded as a tracking unit, serving as an offset corrector. That is, the middle layer 20 tracks the difference between the upper layer's solution and the actual profile, by modifying the parameter values as eventually passed to the lower layer 30. This can for instance be achieved by producing a corrective term that is simply added S28 to the initial parameter value, as assumed in FIG. 2.

The corrections made to the profile $L_{FF}$ are preferably based on derivatives of $L_{FF}$. That is, in embodiments, a profile $L_{dev}$ of derivatives is estimated S16, which corresponds to derivatives of the time-to-energy derivative values $L_{FF}$ as previously stored at step S14. The derivatives $L_{dev}$ can for instance be obtained by deriving the $L_{FF}$ values with respect to the temporal energy consumption C of the vehicle. The parameter values can finally be obtained S26-S28 according to both the comparison outcome and the estimated profile $L_{dev}$ of derivatives, as illustrated in FIGS. 2 and 5.

Note, the derivatives $L_{dev}$ are preferably computed S16 numerically, based on at least two (distinct) profiles of time-to-energy derivative values. In practice, this can be achieved by solving the optimization problem S12 at least twice (based on slightly different input data), which results in at least two profiles of time-to-energy derivative values. Then, the derivatives $L_{dev}$ can be evaluated by means of a finite-difference approximation, using the two (or more) profiles of time-to-energy derivative values.

In practice, the parameter values may for example be computed S26-S28 by first obtaining S26 a correction value $L_{cor}$ and then sum S28 this correction value with the relevant time-to-energy derivative value, i.e., the time-to-energy derivative value that corresponds to the current local section. The correction value $L_{cor}$ may itself be obtained by feeding the comparison outcome to a tracking controller 23. The output of the tracking controller is then multiplied 24 by the relevant derivative value of the profile $L_{dev}$, i.e., the derivative value corresponding to the current local section.

This mechanism is illustrated in FIG. 2. Note, the controller used may for instance be a proportional-integral (PI) controller 23, e.g., a proportional-integral-derivative controller, in which the derivative functionality is not used.

Referring back to FIG. 5, the present methods may typically be performed for controlling the speed of the vehicle along multiple route segments, as suggested by the loop S10-S30-S10. In that case, multiple full-horizon optimizations are performed S10 for respective route segments. Each optimization step S10 is similar to the constrained optimization described earlier and gives rise to respective sets of minimizations S30. That is, for each of the multiple constrained optimizations performed S10, the lower layer repeatedly plans S32 speed values $V_{ref}$ of the vehicle along local sections of the corresponding route segment.

Figure 3:
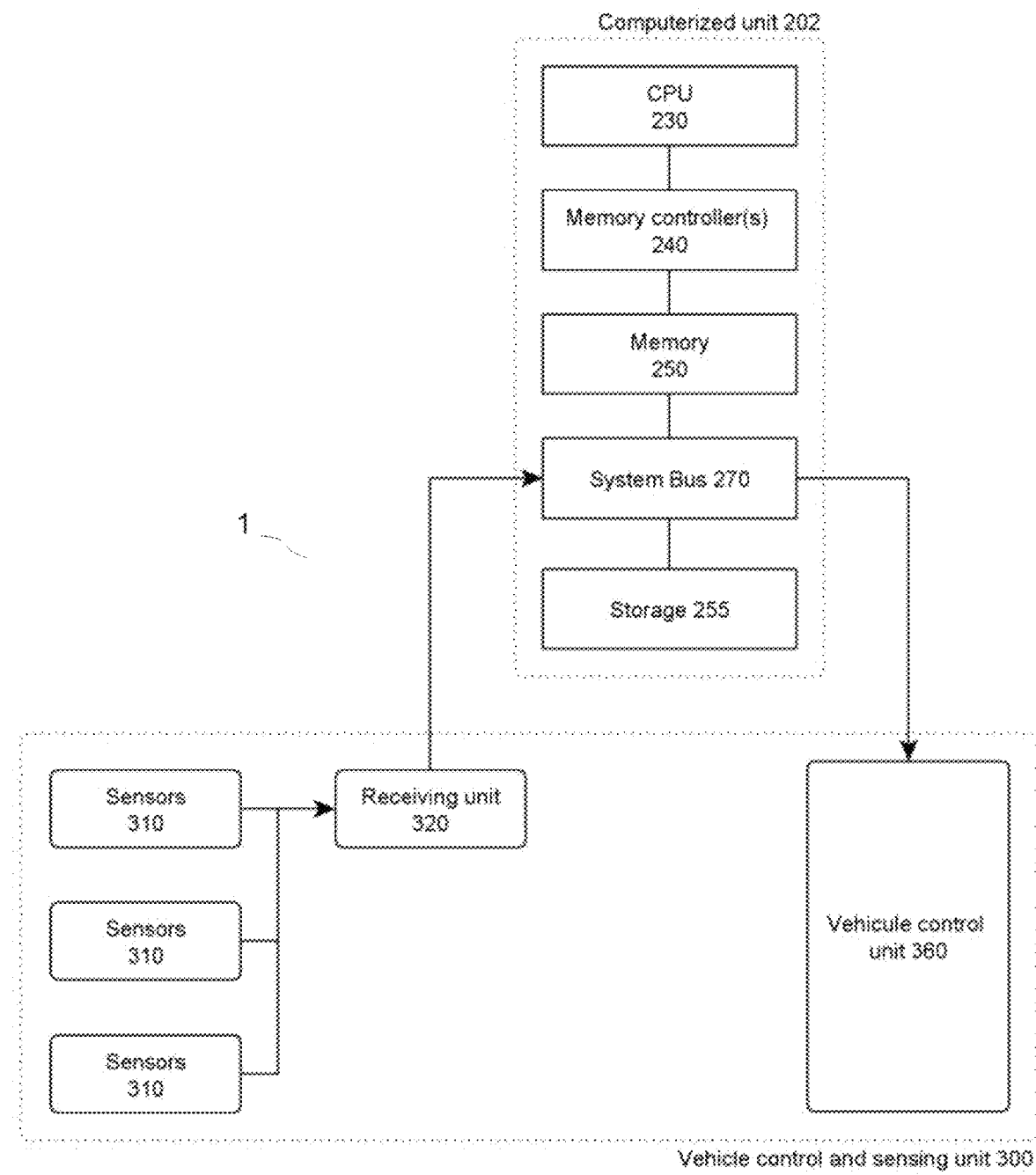
FIG. 3 is a functional diagram of a vehicle that includes a special-purpose computerized system, suited for implementing method steps as in embodiments of the invention.
Figure 4:
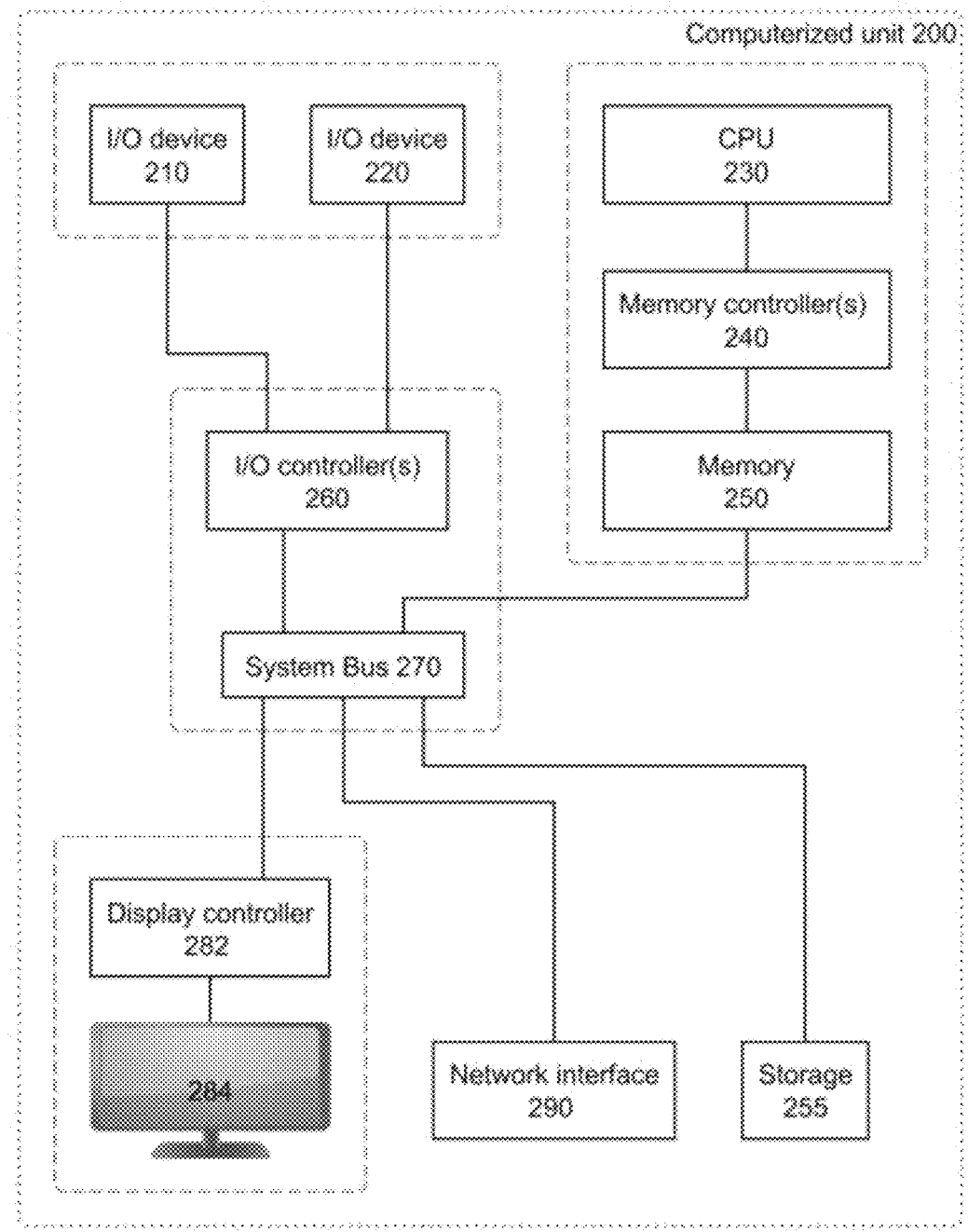
FIG. 4 schematically represents a general-purpose computerized system, suited for implementing method steps as involved in embodiments.

Referring to FIGS. 3 and 4, another aspect of the invention is now described, which relates to a computerized system 200, 202 designed to control a speed of a vehicle along a route segment. The system 202 shown in FIG. 3 is a system embedded in a vehicle 1, whereas the system 200 is a general- or special-purpose computer, which may be configured as a simulation system. Despite differences in terms of intended applications, both systems 200, 202 are functionally similar, inasmuch as they both include processing means 230, a (main) memory 250, and storage means 255. The latter store suitable computerized methods, which can be loaded in the memory 250 to cause the system to take steps as described earlier in reference to the first aspect of the invention, i.e., optimize a target function to determine a reference profile, obtain a profile of parameter values according to a by-product of the optimization, plan speed values $V_{ref}$ of the vehicle for local sections of the route segment, to finally obtain control signals for controlling the speed of the vehicle. Hardware-related aspects of such systems are described in more detail in section 3.

Another, but related, aspect of the invention concerns a vehicle 1. FIG. 3 is a functional diagram showing components of the vehicle 1, wherein such components interact to implement steps as described earlier in reference to the present methods. In the example of FIG. 3, the vehicle 1 includes several sensors 310, a receiving unit 320, and a computerized system 202 as described above. At least one of the sensors 310 is configured to detect a quantity impacting a dynamical state (e.g., speed, acceleration, etc.) of the vehicle 1. In addition, some of the sensors 310 may be configured to detect events or changes in the environment of the vehicle 1, e.g., to enable motion planning S50. The sensors 310 accordingly produce signals, which are transmitted to the receiving unit 320. The latter is suitably connected to the sensors 310, so as to be able to receive such sensor signals, in operation. The computerized system 202 is connected to the receiving unit 320, so as to receive signals therefrom, in operation.

Note, the signals received by the unit 320 may possibly require further processing, in order to be exploited by the system 202. Said further processing may possibly be performed at the receiving unit and/or the system 202. E.g., the system 202 may need to perform data processing to translate and/or further process the signals it receives, or sort specific signals out of the received signals. In all cases, the receiving unit 320 is connected to the sensors and configured to receive said sensor signals from the sensors 310, so as to eventually produce (or cause to produce) the real-time signals needed for carrying out the present methods. I.e., such real-time signals may then be adequately used for the minimizations S30 and, if necessary, for the optimization S10 too. For completeness, the computerized system 202 is configured in the vehicle 1 so as to instruct to actuate the latter according to the control signals obtained, in operation.

Next, according to a final aspect, the invention can be embodied as a computer program product for controlling a speed of a vehicle. Basically, the computer program product comprises a computer readable storage medium having program instructions embodied therewith, where the program instructions executable by a plurality of processing means to cause the latter to take steps according to the present methods. Additional considerations as to such computer program products are provided in Section. 3.

The above embodiments have been succinctly described in reference to the accompanying drawings and may accommodate a number of variants. Several combinations of the above features may be contemplated. Examples are given in the next section.

2. Particularly Preferred Embodiments 2.1 Overview

This section describes methods for calculating, in real-time and online, optimal speed profiles, as well as other profiles of quantities, to accordingly control the speed of a vehicle.

Such methods typically aim at minimizing either the energy consumption for a given time to destination or the time to destination for a given energy budget. They may notably allow road vehicles to drive along a route following a speed profile that is an optimal trade-off between energy consumed and time to reach a destination. The energy may notably relate to the battery charge for electric vehicles, fuel for internal combustion engine vehicles, or a combination of both for hybrid vehicles. Such methods are particularly suitable for long routes, where solving the full optimization problem is impractical or even impossible on standard hardware as typically available on such vehicles. The optimal speed profile is calculated online, in real time, and using a feedback mechanism.

The algorithms discussed in this section involve three layers 10, 20, 30, as discussed in section 1. The upper layer 10 solves a constrained optimization S10 for the entire route. To make it computationally feasible on embedded hardware, this optimization is performed on a coarse grid with large discretization intervals and based on high-level route parameters (such as road inclination, traffic information, speed limits).

The lower layer 30 solves S30 an MPC problem. The optimization of the speed profile on a fine grid (for the near future) is not constrained by energy nor time but minimizes a weighted combination of time and energy. The ratio of the weights of the objective terms is obtained from the solution of the upper layer and can be regarded as the derivative of time-to-energy along the upper level's Pareto front at the (constrained) solution, as schematically depicted in FIG. 7. In other words: the cost of energy is derived at the upper layer 10, while short-term decisions are made at the lower layer 30 to track the optimal solution.

The middle layer 20 serves as an offset corrector, tracking differences observed between outputs from the upper layer's solution and the actual energy profile, by modifying the cost function weights that are passed to the lower level 20. As noted above, information passed to the lower layer use information that can be compared to the gradient of the Pareto front, although the Pareto front does not have to be calculated explicitly. Rather, what is used is the derivative of this function (or a related function), at a specific point, and this value is available as a by-product of the computation required to solve the optimization problem.

2.2 Optimization Problem Solved

To be able to find an optimal speed profile along a route (or route segment), the optimization problem solved S10 takes into account high-level information, macro parameters, and/or permanent parameters, i.e., information applicable to the whole route, such as slope, speed limits, traffic, vehicle performance, powertrain efficiency, external factors like wind, etc.

Optimally solving this problem for the whole route segment (e.g., longer than 5 km ahead) is typically complex, requires high computational power, or an impractically long computation time. High computational power means high computing costs, which is undesirable for a vehicle because of complexity or availability. Long computation time means that the problem cannot be solved online (on the fly, in real time, in the vehicle) and in real time. If the problem cannot be solved in real-time, not all the relevant information (including traffic or other prediction mismatches) will be catered for, hence resulting in an incorrect solution.

Methods described herein solve this problem such that a near-to-optimal speed profile can be calculated online.

2.3 Full-Route Segment Vs. Short-Horizon Optimizations

Such methods actually solve two problems.

The full-route optimization problem is solved online at (very) coarse discretization points. This solution will provide coarse but global information on the optimal speed profile along the whole route segment. By contrast, the short-term optimization problem is solved online for the short horizon. The length of the short horizon can be adaptively defined according to the computational power available. This solution will provide finer and detailed information on the optimal speed profile, where the latter is optimally adjusted to cater for unknowns and prediction mismatches.

Broadly, the full route segment course optimization S10 is used to minimize S30 the cost function of the short horizon optimization problem. Information from the optimization S10 of the entire route is taken into account in a more detailed, but with shorter prediction horizon optimizer 20, so that the overall optimal strategy can be tracked even without the full information. The information passed to the lower layer 30 relates to the Lagrange multipliers of the constrained, full-route segment solution; it leads to smoothly varying speed values that follow the full-route segment solution well. Advantageously, the optimal speed profile can be calculated online with small computational power.

Remarkably, the present methods further involve feedback to adjust for changing conditions. The middle layer 20 allows the upper-layer solution to be tracked (despite possible changes in the driving conditions) by correcting the lower layer optimization problem cost function weights. The energy or time (depending on what is being tracked) correction is determined, and the corresponding weights are obtained by moving by this amount on the Pareto front, by applying feedback linearization using information from the upper layer 10.

Charging/refuelling opportunities (along the route) may possibly be integrated, with minimal modifications, by setting one or more discrete charging points (e.g., a fuel station where some time is spent). This assumes that a model of the charging time/energy (depending on the state of charge) is available. The full-route segment problem is set up to take such information into account. The short-term problem also needs to be set up accordingly, which requires minimal modifications.

2.4 Description of the Quantities Involved

As noted earlier, the route information may notably include road slope, traffic conditions, weather conditions, speed limits, and charging points.

The vehicle model as used at the upper layer 10 requires parameters and initial states of the vehicle, e.g., vehicle and powertrain models (mass, powertrain efficiency map, other parameters), the initial battery state of charge, battery temperature, and user preferences.

The vehicle model used at the lower layer 30 also needs parameters related to the vehicle and powertrain models.

The quantity $L_{FF}$ ("FF" stands for feedforward") is computed as $\partial(1/v)/\partial(C)=\partial t_s/\partial E_s$ (using equivalent notations as for the continuous case) and corresponds to the profile of derivatives of time to energy (for each individual route section), linearized at the upper layer's solution, where C refers to consumption, with unit J/m. That is, the profile of derivatives of time to energy is a nonlinear function, which is linearized (i.e., approximated by a linear function) at the level of a data point corresponding to the upper layer's solution.

The energy reference profile (or energy consumption profile) $X^*_{ref}$ results from the solution of the optimization problem in the upper layer 10.

$L_{dev}$ is equivalent to $\partial L_{FF}/\partial C$, i.e., it is the profile of derivatives of $L_{FF}$, with respect to consumption C, which is opportune inasmuch as outputs from the tracker 20 typically represent a consumption.

$L_{cor}$ denotes a feedback correction to $L_{FF}$; it is a correction term calculated in the middle layer 20.

$V_{ref}$ corresponds to a short-horizon speed profile, also corresponding to planned speed values, i.e., optimal velocities to be followed by the vehicle 1, whereas $V_{act}$ is the actual vehicle velocity, corresponding to $X_{act}$, the actual energy (or energy consumption) used by the vehicle.

2.5 Preferred Processes

The present methods may notably calculate: (i) the optimal speed profile to minimize time at destination given an energy budget (or a maximum available energy, $E_{rem}$); or (ii) the optimal speed profile to minimize energy usage given a fixed time to reach destination.

Note, such methods assume that the problem is solvable, meaning that, e.g., a user can select a maximum energy budget that allows the trip to be completed or a minimum time at destination that is achievable for the available energy. In either case, constraints such as speed limits, dynamics of the vehicle, etc., are respected.

What follows describes preferred processes to solve the problem (i) above, i.e., the calculation of the optimal speed profile to minimize time at destination given an energy budget. The solution to the second problem (ii) can easily be adapted from the first solution.

Such processes can be implemented in different ways. In a basic implementation, the upper layer is executed only once for every journey. In an alternative implementation, the upper layer is executed a few times for a single journey, e.g., every few kilometres. The following describes the basic implementation and then briefly describes the differences between alternative implementation and the basic implementation.

The upper layer 10 solves S10 a full-horizon optimization problem to calculate $X^*_{ref}$ and t*, where $X^*_{ref}$ is the optimal energy profile and t* is the optimal (shortest) time to complete the journey. The optimization problem aims at finding the minimum time as a function of the energy usage subject to the physical model of the vehicle and $E_{rem}$, the remaining energy available.

A by-product of the optimization S10 is the value $L_{FF}$, which is the profile of the derivative of time to energy for every upper level stage. It is a by-product of step S10 because solving the nonlinear programming (NLP) requires calculating an upper-level cost function gradient, i.e., the derivative of cost (time) to the variables (energy for each section). In embodiments where the optimization is energy-constrained, the optimization S10 minimizes travel time with respect to this energy constraint.

The upper layer 10 further computes $L_{dev}=\partial L_{FF}/\partial C$, which is the derivative of $L_{FF}$ to consumption, evaluated for the current route segment. This can be computed numerically, e.g., by evaluating the function that provides $L_{FF}$ twice, based on slightly different input conditions. The two results will produce two slightly different values for $L_{FF}$ so that $\partial L_{FF}/\partial C$ can be calculated numerically, using a finite difference approximation.

The upper layer relies on a model of the vehicle and other information. The model describes the relation between velocity, battery power, and distance-dependent road parameters. This model may notably require inputs related to: (i) vehicle states (velocity, battery energy, and thermal states); the energy profile function $X_{ref}$; and parameters such as distance-varying parameters (road inclination, traffic, curvature of the road, speed limits, wind speed, and direction). The optimization problem S10 in the upper layer 10 is only solved once at the beginning of the journey (the route segment).

The middle layer 20 tracks the profile planned by the upper layer 10. It includes a discrete-time Proportional-Integral (PI) controller. The middle layer, via the feedback loop and the PI controller, compensates for the model mismatch between the upper layer 10 (which uses a coarse model for the whole profile) and the lower layer (which uses a more detailed model of the near future conditions). This integral controller includes methods to avoid integrator windup.

The term $L_{dev}$ converts the imposed error dynamics by the controller (in J/m) to the actual control action ($L_{cor}$ in s/J), which can be regarded as a particular implementation of the so-called input-state feedback linearization method.

The lower layer 30 solves an optimization problem to calculate the optimal, short-horizon speed profile $V_{ref}$. The problem uses a vehicle model suitable for fast computation and does not have constraints on time or energy consumption. The problem can be written as:

$V_{ref}$=minimize (t, $(L_{FF}+L_{cor})E$), subject to the lower-layer vehicle model.

The vehicle model used in the lower layer may notably read as input: (i) vehicle states (velocity, battery energy, thermal states); (ii) road parameters (curvature, obstacles, obstacles predictions, traffic lights states, road inclination, wind speed and direction); (iii) and controls (longitudinal acceleration, battery power).

The lower-layer model also includes longitudinal and battery dynamics. It imposes combined longitudinal and lateral acceleration limits along the curvature. It further imposes limitations on a combination of power, velocity and longitudinal acceleration that correspond to detailed powertrain and vehicle efficiency characteristics (including regenerative braking limits). It may further satisfy constraints emerging due to other vehicles, speed limits, and traffic lights.

In variants, instead of solving the optimization problem in the upper layer once, the optimization problem is solved multiple times (e.g., every few kilometres) as the vehicle travels along the route segment. This improves the correction of divergences from the profile.

The main differences between the alternative implementation and the basic implementation are the following. In the alternative implementation, $X_{ref}$ is the energy consumption profile (instead of the energy profile as in the basic implementation). Consistently, $X_{act}$ denotes the actual energy consumption. Finally, in the alternative implementation, the PI controller is simply an integral controller, i.e. the proportional gain is set to zero.

3. Technical Implementation Details—Computerized Systems and Computer Program Products Computerized devices can be suitably designed for implementing embodiments of the present invention as described herein. In that respect, it can be appreciated that the methods described herein are at least partly non-interactive, i.e., automated. Automated parts of such methods can be implemented in software, hardware, or a combination thereof. In exemplary embodiments, automated parts of the methods described herein are implemented in software, as a service or an executable program (e.g., an application), the latter executed by suitable digital processing devices.

For instance, as depicted in FIG. 4, a typical computerized device (or unit) 200 may include a processor 230 and a memory 250 (possibly including several memory units) coupled to one or memory controllers 240. The processor 230 is a hardware device for executing software, as e.g., loaded in a main memory of the device. The processor, which may in fact comprise one or more processing units, can be any custom made or commercially available processor. The system 202 shown in FIG. 3 is similar to the system 200 in many respects.

The memory typically includes a combination of volatile memory elements (e.g., random access memory) and non-volatile memory elements, e.g., a solid-state device. The software in memory may include one or more separate programs, each of which comprises an ordered listing of executable instructions for implementing logical functions. In the example of FIG. 4, the software in the memory includes methods described herein in accordance with exemplary embodiments and a suitable operating system (OS). The OS essentially controls the execution of other computer (application) programs and provides scheduling, input-output control, file and data management, memory management, and communication control and related services. It may further control the distribution of tasks to be performed by the processing units 230.

The methods described herein shall typically be in the form of executable program, script, or, more generally, any form of executable instructions, although part (or all) of the algorithms described herein are preferably executed according to nonlinear programming instructions.

The computerized unit 200 can further include a display controller 282 coupled to a display 284. In exemplary embodiments, the computerized unit 200 further includes a network interface 290 or transceiver for coupling to a network (not shown). In addition, the computerized unit 200 will typically include one or more input and/or output (I/O) devices 210, 220 (or peripherals) that are communicatively coupled via a local input/output controller 260. A system bus 270 interfaces all components. Further, the local interface may include address, control, and/or data connections to enable appropriate communications among the aforementioned components. The I/O controller 135 may have additional elements, which are omitted for simplicity, such as controllers, buffers (caches), drivers, repeaters, and receivers, to allow data communication.

When the computerized unit 200 is in operation, one or more processing units 230 executes software stored within the memory of the computerized unit 200, to communicate data to and from the memory 250 and/or the storage unit 255 (e.g., a hard drive and/or a solid-state memory), and to generally control operations pursuant to software instruction. The methods described herein and the OS, in whole or in part are read by the processing elements, typically buffered therein, and then executed. When the methods described herein are implemented in software, the methods can be stored on any computer readable medium for use by or in connection with any computer related system or method.

Computer readable program instructions described herein can for instance be downloaded to processing elements from a computer readable storage medium, via a network, for example, the Internet and/or a wireless network. A network adapter card or network interface 290 may receive computer readable program instructions from the network and forwards such instructions for storage in a computer readable storage medium 255 interfaced with the processing means 230.

Aspects of the present invention are described herein notably with reference to a flowchart and a block diagram. It will be understood that each block, or combinations of blocks, of the flowchart and the block diagram can be implemented by computer readable program instructions.

These computer readable program instructions may be provided to one or more processing elements 230 as described above, to produce a machine, such that the instructions, which execute via the one or more processing elements create means for implementing the functions or acts specified in the block or blocks of the flowchart and the block diagram. These computer readable program instructions may also be stored in a computer readable storage medium.

The flowchart and the block diagram in the accompanying drawings illustrate the architecture, functionality, and operation of possible implementations of the computerized unit 200, methods of operating it, and computer program products according to various embodiments of the present invention. Note that each computer-implemented block in the flowchart or the block diagram may represent a module, or a portion of instructions, which comprises executable instructions for implementing the functions or acts specified therein. In variants, the functions or acts mentioned in the blocks may occur out of the order specified in the figures. For example, two blocks shown in succession may actually be executed in parallel, concurrently or still in a reverse order, depending on the functions involved and the algorithm optimization retained. It is also reminded that each block and combinations thereof can be adequately distributed among special purpose hardware components.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, other target functions and cost functions may possibly be devised by the skilled person.

What is claimed is:

1. A computer-implemented method for controlling a speed of a vehicle given energy-related quantities that pertain to moving the vehicle, each of said quantities being referred to as an energy expense, wherein the method comprises:
    based on route parameters of a route segment, performing a full-horizon optimization by optimizing a target function of a profile of an energy expense, to determine a reference profile $X^*_{ref}$ of the energy expense for the entire route segment, the full-horizon optimization constrained with respect to objectives in respect of a total travel time and/or a total travel energy expense for the vehicle to travel said route segment,
    wherein the target function represents a travel time $t(X_{ref})$ for the vehicle to travel said route segment, and is optimized so as to identify said reference profile $X^*_{ref}$ as an argument of a minimum of the target function;
    obtaining a profile of parameter values based on time-to-energy derivative values obtained according to a by-product of the full-horizon optimization;
    based on real-time signals capturing current states of the vehicle, repeatedly determining short-horizon speed profiles of the vehicle to plan speeds $V_{ref}$ of the vehicle along local sections of said route segment, by minimizing, for each of the local sections, a cost function as parameterized by one of the parameter values, the cost function capturing a cost of deviating from an output of the optimized target function due to the short-horizon speed profiles, wherein said output and said one of the parameter values pertain, each, to said each of the local sections;
    based on the planned speeds $V_{ref}$, obtaining control signals for controlling a speed of the vehicle along each of said local sections of the route segment; and
    actuating the vehicle in the physical world, according to the obtained control signals.

2. The method according to claim 1, wherein
the cost function is a linear combination of two dependent variables, including a first variable t related to a travel time and a second variable E related to a travel energy expense, wherein the second variable is weighted by said one of the parameter values, and
the profile of parameter values reflects a rate of change of the travel time with respect to the travel energy expense, whereby the cost function represents a temporal cost of locally deviating from said output of the optimized target function.

3. The method according to claim 2, wherein the time-to-energy derivative values are obtained as a profile $L_{FF}$ of time-to-energy derivative values, according to the by-product of the full-horizon optimization,
    the method further comprising storing the profile $L_{FF}$ of time-to-energy derivative values with a view to obtaining the profile of parameter values, and
    the profile of parameter values is obtained based on the profile $L_{FF}$ of time-to-energy derivative values.

4. The method according to claim 3, wherein the method further comprises:
    monitoring the actual profile $X_{act}$ of the energy expense of the vehicle as it travels along the route segment; and
    comparing the actual profile $X_{act}$ monitored with the reference profile $X^*_{ref}$ obtained from the constrained full-horizon optimization to obtain a comparison outcome, whereby the profile of parameter values is obtained according to both the profile $L_{FF}$ of time-to-energy derivative values and said comparison outcome.

5. The method according to claim 4, wherein the method further comprises:
    estimating a profile $L_{dev}$ of derivatives of the time-to-energy derivative values with respect to a temporal energy consumption C of the vehicle; and
    the parameter values are obtained according to both the comparison outcome and the estimated profile $L_{dev}$ of derivatives of the time-to-energy derivative values.

6. The method according to claim 5, wherein
estimating the derivatives of the time-to-energy derivative values comprises numerically computing such derivatives based on at least two profiles of time-to-energy derivative values.

7. The method according to claim 5, wherein obtaining said parameter values comprises:
    obtaining a correction value $L_{cor}$ by
        feeding the comparison outcome to a tracking controller to obtain a tracking controller output, and
        multiplying the tracking controller output obtained by an estimated one of the derivatives of the time-to-energy derivative values corresponding to said each of the local sections to obtain a correction value; and
    summing the correction value with one of the time-to-energy derivative values that corresponds to said each of the local sections to obtain said one of the parameter values.

8. The method according to claim 1, wherein said constrained full-horizon optimization is performed subject to:
a model of the vehicle taking said route parameters as inputs; and
one of the total travel time and the total travel energy expense being less than or equal to a given value at the end of a journey corresponding to said route segment.

9. The method according to claim 8, wherein performing said constrained full-horizon optimization further comprises:
feeding the model of the vehicle with one or each of permanent parameters of the vehicle and an initial state of the vehicle.

10. The method according to claim 1, wherein the method is performed for controlling the speed of the vehicle along multiple route segments, whereby the method comprises:
performing multiple full-horizon optimizations, each similar to said full-horizon optimization, for respective ones of the multiple route segments, and,
for each of the multiple full-horizon optimizations performed, repeatedly determining short-horizon speed profiles of the vehicle to plan speeds of the vehicle along local sections of a respective one of said route segments.

11. The method according to claim 1, wherein
the speeds are planned using a model predictive control (MPC) algorithm.

12. The method according to claim 11, wherein
the MPC algorithm is run using a nonlinear programming solver.

13. The method according to claim 1, wherein
the cost function is minimized subject to a dynamical model of the vehicle, the dynamical model taking said real-time signals as input, wherein the real-time signals represent one or more of a speed, an acceleration, an available energy, a thermal state, a powertrain, and a braking efficiency of the vehicle.

14. The method according to claim 1, wherein
the method further comprises planning motion of the vehicle based on the control signals obtained, and
the motion planned is constrained according to the planned speeds.

15. The method according to claim 1, wherein
an average duration of minimizing the cost function is, for each of the local sections, between 10 ms and 1 s.

16. A computerized system for controlling a speed of a vehicle given energy-related quantities that pertain to moving the vehicle, each of said quantities referred to as an energy expense, the system comprising:
processing means;
a memory; and
storage means storing computerized methods,
wherein the computerized system is configured to load the computerized methods in the memory and run the loaded computerized methods, so as to cause the processing means to:
based on route parameters of a route segment, perform a full-horizon optimization by optimizing a target function of a profile of an energy expense, to determine a reference profile $X^*_{ref}$ of the energy expense for the entire route segment, the full-horizon optimization constrained with respect to objectives in respect of a total travel time and/or a total travel energy expense for the vehicle to travel said route segment,
wherein the target function represents a travel time $t(X_{ref})$ for the vehicle to travel said route segment, and is optimized so as to identify said reference profile $X^*_{ref}$ as an argument of a minimum of the target function;
obtain a profile of parameter values based on time-to-energy derivative values obtained according to a by-product of the full-horizon optimization;
based on real-time signals capturing current states of the vehicle, repeatedly determine short-horizon speed profiles of the vehicle to plan speeds $V_{ref}$ of the vehicle along local sections of said route segment by minimizing, for each of the local sections, a cost function as parameterized by one of the parameter values, the cost function capturing a cost of deviating from an output of the optimized target function due to the short-horizon speed profiles, wherein said output and said one of the parameter values pertain, each, to said each of the local sections; and
obtain, based on the planned speeds $V_{ref}$, control signals for controlling a speed of the vehicle along each of said local sections of the route segment; and
actuate the vehicle in the physical world, according to the obtained control signals.

17. A vehicle, comprising:
one or more sensors, each configured to detect a quantity impacting a dynamical state of the vehicle and accordingly produce sensor signals;
a receiving unit connected to the one or more sensors and configured to receive said sensor signals from the sensors to produce said real-time signals; and
a computerized system comprising a processor and a memory,
wherein the processor is to execute machine readable instructions stored in the memory to:
based on route parameters of a route segment, perform a full-horizon optimization by optimizing a target function of a profile of an energy expense, to determine a reference profile $X^*_{ref}$ of the energy expense for the entire route segment, the full-horizon optimization constrained with respect to objectives in respect of a total travel time and/or a total travel energy expense for the vehicle to travel said route segment,
wherein the target function represents a travel time $t(X_{ref})$ for the vehicle to travel said route segment, and is optimized so as to identify said reference profile $X^*_{ref}$ as an argument of a minimum of the target function;
obtain a profile of parameter values based on time-to-energy derivative values obtained according to a by-product of the full-horizon optimization;
based on real-time signals capturing current states of the vehicle, repeatedly determine short-horizon speed profiles of the vehicle to plan speeds $V_{ref}$ of the vehicle along local sections of said route segment by minimizing, for each of the local sections, a cost function as parameterized by one of the parameter values, the cost function capturing a cost of deviating from an output of the optimized target function due to the short-horizon speed profiles, wherein said output and said one of the parameter values pertain, each, to said each of the local sections; and
obtain, based on the planned speeds $V_{ref}$, control signals for controlling a speed of the vehicle along each of said local sections of the route segment,
wherein, the computerized system is further configured in the vehicle so as to instruct to actuate the vehicle according to the obtained control signals, and the vehicle is actuated in the physical world, according to the obtained control signals.

18. A non-transitory computer readable medium storing machine readable instructions executable by a processor for controlling a speed of a vehicle given energy-related quantities that pertain to moving the vehicle, each of said quantities being referred to as an energy expense, wherein to control the speed of the vehicle, the machine readable instructions are executable to:

based on route parameters of a route segment, perform a full-horizon optimization by optimizing a target function of a profile of an energy expense, to determine a reference profile $X^*_{ref}$ of the energy expense for the entire route segment, the full-horizon optimization constrained with respect to objectives in respect of a total travel time and/or a total travel energy expense for the vehicle to travel said route segment, wherein the target function represents a travel time t(Xref) for the vehicle to travel said route segment, and is optimized so as to identify said reference profile as an argument of a minimum of the target function;

obtain a profile of parameter values based on time-to-energy derivative values obtained according to a by-product of the full-horizon optimization;

based on real-time signals capturing current states of the vehicle, repeatedly determine short-horizon speed profiles of the vehicle to plan speeds $V_{ref}$ of the vehicle along local sections of said route segment by minimizing, for each of the local sections, a cost function as parameterized by one of the parameter values, the cost function capturing a cost of deviating from an output of the optimized target function due to the short-horizon speed profiles, wherein said output and said one of the parameter values pertain, each, to said each of the local sections;

obtain, based on the planned speeds $V_{ref}$, control signals for controlling a speed of the vehicle along each of said local sections of the route segment; and actuate the vehicle in the physical world, according to the obtained control signals.

\* \* \* \* \*